US008851998B2

(12) United States Patent
Pawson

(10) Patent No.: US 8,851,998 B2
(45) Date of Patent: Oct. 7, 2014

(54) FANTASY SPORTS ROSTER MANAGEMENT SYSTEM AND METHOD

(75) Inventor: David Pawson, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 117 days.

(21) Appl. No.: 13/106,081

(22) Filed: May 12, 2011

(65) Prior Publication Data
US 2012/0289340 A1 Nov. 15, 2012

(51) Int. Cl.
A63F 9/00 (2006.01)
A63F 13/30 (2014.01)

(52) U.S. Cl.
CPC ......... *A63F 13/12* (2013.01); *A63F 2300/8052* (2013.01); *A63F 2300/69* (2013.01)
USPC ......................................................... 463/42

(58) Field of Classification Search
None
See application file for complete search history.

(56) References Cited

U.S. PATENT DOCUMENTS

| 6,371,855 | B1* | 4/2002 | Gavriloff | 463/42 |
|---|---|---|---|---|
| D594,464 | S * | 6/2009 | Ng et al. | D14/486 |
| 8,105,159 | B2* | 1/2012 | Wojewoda et al. | 463/31 |
| 8,113,958 | B2* | 2/2012 | Johnson, Jr. | 463/42 |
| 2004/0110552 | A1* | 6/2004 | Del Prado | 463/4 |
| 2004/0266530 | A1* | 12/2004 | Bishop | 463/42 |
| 2006/0217198 | A1* | 9/2006 | Johnson | 463/40 |
| 2006/0247056 | A1* | 11/2006 | Luckerson | 463/42 |
| 2006/0252476 | A1* | 11/2006 | Bahou | 463/4 |
| 2007/0004516 | A1* | 1/2007 | Jordan et al. | 463/42 |
| 2007/0060325 | A1* | 3/2007 | Gradek | 463/29 |
| 2007/0243917 | A1* | 10/2007 | Wojewoda et al. | 463/9 |
| 2007/0243918 | A1* | 10/2007 | Wojewoda et al. | 463/9 |
| 2008/0102911 | A1* | 5/2008 | Campbell et al. | 463/9 |
| 2008/0207333 | A1* | 8/2008 | Johnson | 463/42 |
| 2009/0156312 | A1* | 6/2009 | Ng et al. | 463/42 |

OTHER PUBLICATIONS

"Rules: Custom League Roster Settings". Aug. 13, 2009. <https://web.archive.org/web/20090813100856/http://games.espn.go.com/ffl/content?page=fflrulesrosterscustom2009>.*

* cited by examiner

Primary Examiner — Seng H Lim
(74) Attorney, Agent, or Firm — James J. DeCarlo; Greenberg Traurig, LLP

(57) ABSTRACT

Disclosed is a system and method for an active roster of a fantasy sports team in a fantasy sports league. In one aspect, a server computer receives, over a network from a user computer operated by a user managing a fantasy sports team in a head-to-head fantasy sports league, an active roster of players, bench players, and an inactive roster of players. The inactive roster includes players that are assigned by the user to not accumulate points during a predetermined period of time and who cannot become bench players or part of the active roster during the predetermined period of time. The server computer determines points earned by each player of the active roster of the fantasy sports team. The server computer transmits to the user computer the active roster, the bench players, the inactive roster, and the points earned by each player of the active roster.

20 Claims, 4 Drawing Sheets

US 8,851,998 B2

FANTASY SPORTS ROSTER MANAGEMENT SYSTEM AND METHOD

FIELD

The present disclosure relates to fantasy sports roster management, and more specifically to reducing the impact on a fantasy team in a head-to-head scoring league when their players become injured.

BACKGROUND

Fantasy sports leagues have become extremely popular. In a fantasy sport league, people (also referred to below as users or owners) draft real-life sports players for their fantasy teams. The drafted real-life sports players can be on the same real-life team or different real-life teams. The players then accrue points for the fantasy sports team depending on how the real-life sports player does in his or her sport in real life. For example, a person that is part of a basketball fantasy sports league may draft Kobe Bryant and Derrick Rose to play guards on the person's fantasy sports team. When Kobe Bryant scores 30 points in a real-life NBA game, Kobe Bryant may earn 30 fantasy points for the person's fantasy sports team. Similarly, when Derrick Rose dishes out 10 assists in a real-life NBA game, Derrick Rose may accrue 10 fantasy points for the person's fantasy sports team.

There are various ways that a fantasy league can do its scoring based on the actual statistics. For example, in a rotisserie scoring league, statistics are typically accumulated for the entire season, and compared to all other teams in the league to figure out a user's scoring within the league. In a head-to-head league, usually a user's statistics for one week are compared to a single other team for that week, and at the end of the week the teams get some number of wins and losses based on that comparison. The league standings are based on those wins and losses. In a points-based scoring league, real life statistics contribute corresponding points to a team, and the league standings are based on who has accumulated the most points. For example, a real-life point might be worth 1 fantasy point, a real-life assist may be worth 5 fantasy points, etc.

SUMMARY

Many fantasy sports leagues are head-to-head leagues. In a head-to-head fantasy sports league, one person's fantasy sports team plays against another person's fantasy sports team for a given period of time, such as a week. The points accrued by the players of one fantasy sports team are totaled for the given period of time and compared against the points accrued by the players of another fantasy sports team for the given period of time. To accumulate the highest number of points during a head-to-head competition, an owner typically wants to have the highest number of his or her players playing each day.

Typically, a head-to-head league is configured to use some set of statistics. For example, the statistics may include points, rebounds, assists, and turnovers. At the end of the week, the points one person's team scored during the week is compared to the points another team scored during the week. Whichever team had more points would be credited with a win, and the other would be credited with a loss. Then the person's team's rebounds would be compared to the other team's rebounds. Whoever had more would get a win, the other a loss. Then assists would be compared, and the team with more for the week gets a win, the other gets a loss. Finally, turnovers would be compared. The team with fewer turnovers gets a win (since turnovers are bad), while the team with more gets a loss. Thus, each person would get 4 "games" in the standings, credited as wins, losses, or ties.

Fantasy sports rosters typically include starter slots for players that will accumulate points for the fantasy sports team during the given period of time, bench slots for players on a fantasy sports team that will not be accumulating points for the fantasy sports team during the given period of time, and injured reserve slots for players that are injured and will not be accumulating points for the fantasy sports team for the given period of time. The owner can typically move players around in their lineup (e.g., from a bench player to a starting player) before the given period of time begins. If a player on a fantasy sports team suffers an injury and is therefore placed in one of the team's injured reserve slots, the owner therefore has one less player to choose from that can start and accumulate points for the fantasy sports team. This decreases the ability of the owner to maximize the number of games played by players of his or her fantasy sports team for a given day/night.

This disclosure relates to a method and apparatus for an active roster of a fantasy sports team in a fantasy sports league. In one aspect, a server computer receives, over a network (such as the Internet) from a user computer operated by a user managing a fantasy sports team in a head-to-head fantasy sports league, an active roster of players of the fantasy sports team, bench players of the fantasy sports team, and an inactive roster of players of the fantasy sports team. The inactive roster includes players of the fantasy sports team that are assigned by the user to not accumulate points during a predetermined period of time and who cannot become bench players or part of the active roster during the predetermined period of time. The server computer determines points earned by each player of the active roster of the fantasy sports team. The server computer transmits to the user computer the active roster, the bench players, the inactive roster, and the points earned by each player of the active roster of the fantasy sports team.

In one embodiment, inactive roster slots of the inactive roster are shaded a different color than slots of the active roster. In one embodiment, the active roster is part of a roster of players, the roster of players comprising the players of the starting roster and bench players.

In one embodiment, the determining of points earned by each player of the active roster further comprises determining statistics associated with the players of the active roster. The fantasy sports team can include basketball players, baseball players, football players, hockey players, etc.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
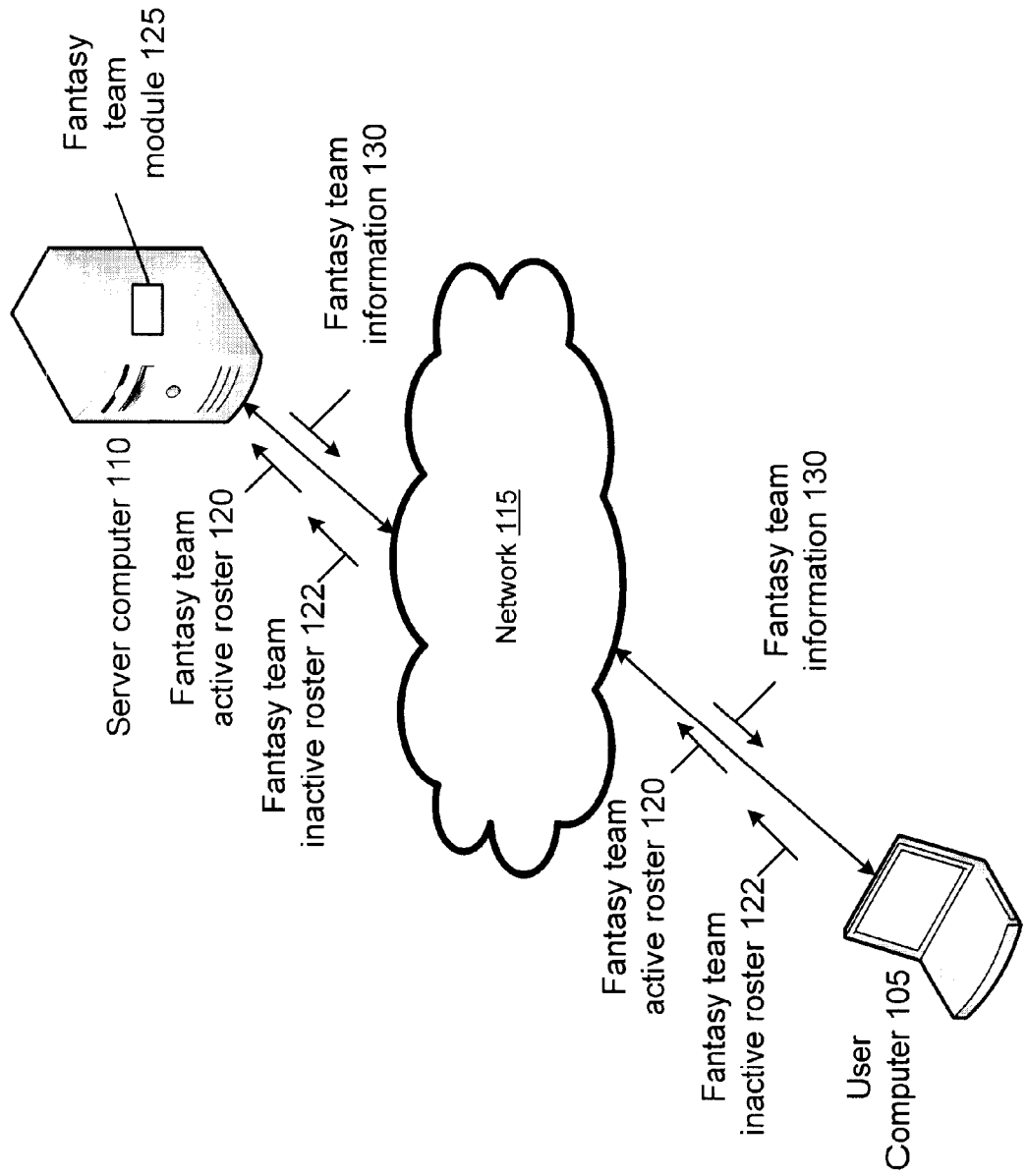
FIG. 1 is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Figure 2:
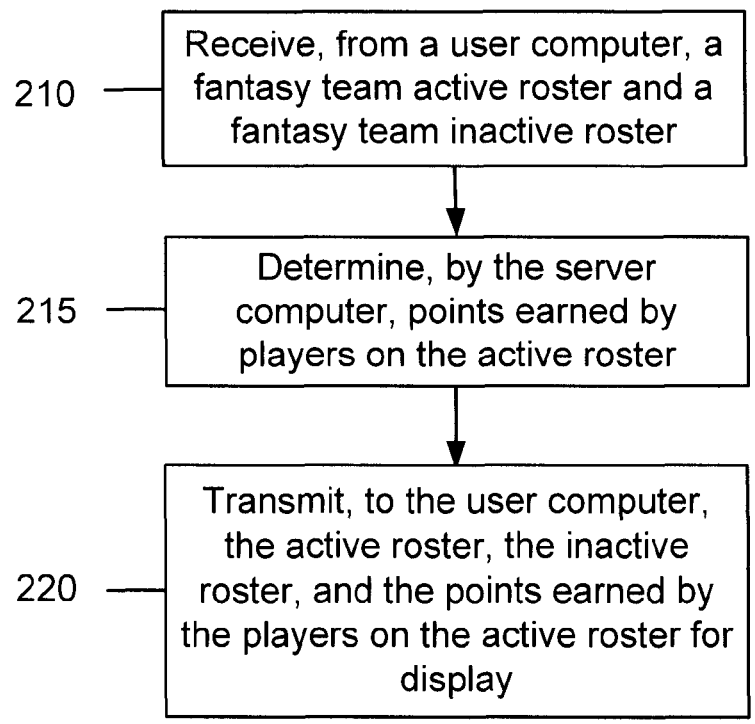
FIG. 2 is a flowchart illustrating steps performed by the server computer of FIG. 1 in accordance with an embodiment of the present disclosure.

FIG. 1 is a block diagram of an embodiment of a user computer 105 communicating with a server computer 110 that can be utilized to provide user access to one or more fantasy sports applications. Sever 110 would generate and/or serve web pages, for example, to be displayed by a browser (not shown) of user computer 105 over a network 115 such as the Internet. In one embodiment, an owner of a fantasy sports team uses the user computer 105 to manage his or her fantasy sports team roster. FIG. 2 is a flowchart of an embodiment of the steps performed by the sever computer 110 during the owner's management of his or her fantasy sports team roster.

In one embodiment, instead of a fantasy sports roster with injured reserve slots, a fantasy sports team owner would specify, prior to each head-to-head matchup, an "active roster" of the players eligible to play and gather statistics for the given time period (e.g., for the week). In one embodiment, during the course of the week, the owner can then make daily roster changes involving any players on the active roster. In this way, a fantasy league can account for injured players without crippling the teams that own the injured players. For example, a league could be configured to have 14 man rosters with 10 starting lineup slots, but an active roster size of 12. In this embodiment, any team with 2 or fewer injured players would not be at a disadvantage during the week. Having a player on the active roster get injured during the week would be damaging, but both teams would start on even footing, and this sort of occurrence would be more analogous to the real world.

In one embodiment, the server computer 110 receives, from the user computer 105 over network 115, a fantasy team active roster 120 and a fantasy team inactive roster 122 (step 210). The server computer 110 includes a fantasy team module 125 that determines points earned by each player of the active roster during the given period of time (step 215). The server computer 110 then transmits to the user computer 105 fantasy team information 130. The fantasy team information 130 can include, for example, the points earned by each player of the active roster of the fantasy sports team, the active roster, the bench players, and/or the inactive roster (step 220). In one embodiment, the fantasy team information 130 is displayed via a web page to the user on a display of the user computer 105. In one embodiment, the transmitting of the active roster, the bench players, and the inactive roster to the user computer 105 includes updating the active roster, the bench players, and/or the inactive roster.

The fantasy team information can be any information associated with the fantasy team, such as points earned by one or more starting players of the fantasy team, statistics, news stories associated with one or more players of the fantasy team, etc. In one embodiment, the fantasy team module 125 then totals the score of the fantasy team's active roster and compares this total to the total determined for the active roster of the other fantasy sports team in the head-to-head competition to determine a winner for the given period of time.

Figure 3:
FIG. 3 is an exemplary user interface, in this embodiment a web page, having inactive roster slots in accordance with an embodiment of the present disclosure.

FIG. 3 is an example of a user interface, in this embodiment a web page of a roster 300 for a fantasy basketball sports team (called "The Wild Helicopter"). In one embodiment, the roster 300 includes a point guard position 305 (filled in this example by Brandon Jennings), a shooting guard position 310 (filled in this example by Paul Pierce), a guard position 315 (filled in this example by Francisco Garcia), a small forward position 320 (filled in this example by Nicolas Batum), a power forward position 325 (filled in this example by Kenyon Martin), a forward position 330 (filled in this example by Kevin Garnett), a first center position 335 (filled in this example by Amar'e Stoudemire), a second center position 340 (filled in this example by Greg Monroe), a first utility position 345 (filled in this example by James Harden), a second utility position 350 (filled in this example by Mike Conley), a first bench position 355 (filled in this example by Dwight Howard), a second bench position 360 (filled in this example by Tim Duncan), a third bench position 365 (filled in this example by Dorell Wright), a first inactive position 370 (filled in this example by Kyle Lowry), a second inactive position 375 (filled in this example by Gordon Hayward), and a third inactive position 380 (filled in this example by Al Jefferson). In one embodiment, the inactive roster slots (here, slots 370, 375, and 380) are shaded a different color from the rest of the roster slots so that the owner can easily and quickly determine which players are inactive. The players in the inactive slots and the bench players do not contribute to the point total of the roster 300.

The owner can make a player inactive for any reason, such as injury, lack of skill, personal reasons, etc. Thus, the fantasy league does not need to determine who is actually injured and appropriate for an inactive roster slot.

In one embodiment, other statistics are also determined and transmitted by the fantasy team module 125, such as for example the opponent that the player is playing against 390, the time of the game 395, and the percent 397 of leagues in the entire game where that player is being started. Other statistics may also be determined and/or displayed. For example, if the fantasy league was a basketball fantasy league, the statistics determined and/or displayed can be points, field goal percentage, assists, blocks, rebounds, steals, free throws, free throw percentage, etc.

The number of starting player slots, utility player slots, bench player slots, and/or inactive player slots can be adjusted and/or agreed upon at the start of or at predetermined points during the fantasy sports season. In one embodiment, before the start of the next week in the fantasy sports league, the owner submits to the server computer 110 the list of active players on his or her roster 300 and/or the list of inactive players on his or her roster 300. During the week of the head-to-head competition, in one embodiment the inactive players 370, 375, 380 can't be dragged to another roster slot in the roster 300.

The inactive roster slots and active roster can be used to limit the benefits or impact of "streaming", which is intentionally using some number of roster slots to drop and add players each day to maximize the number of games played. Some fantasy leagues find this tactic undesirable and attempt to prevent users from doing this.

Although described herein with respect to basketball, it should be noted that the present disclosure can be applied to any fantasy sports league, such as baseball, football, hockey, etc. Additionally, although the data is described as being transmitted to a browser, in another embodiment the data is delivered to a dedicated application, such as a mobile application or a desktop application (e.g., a Flash application).

Figure 4:
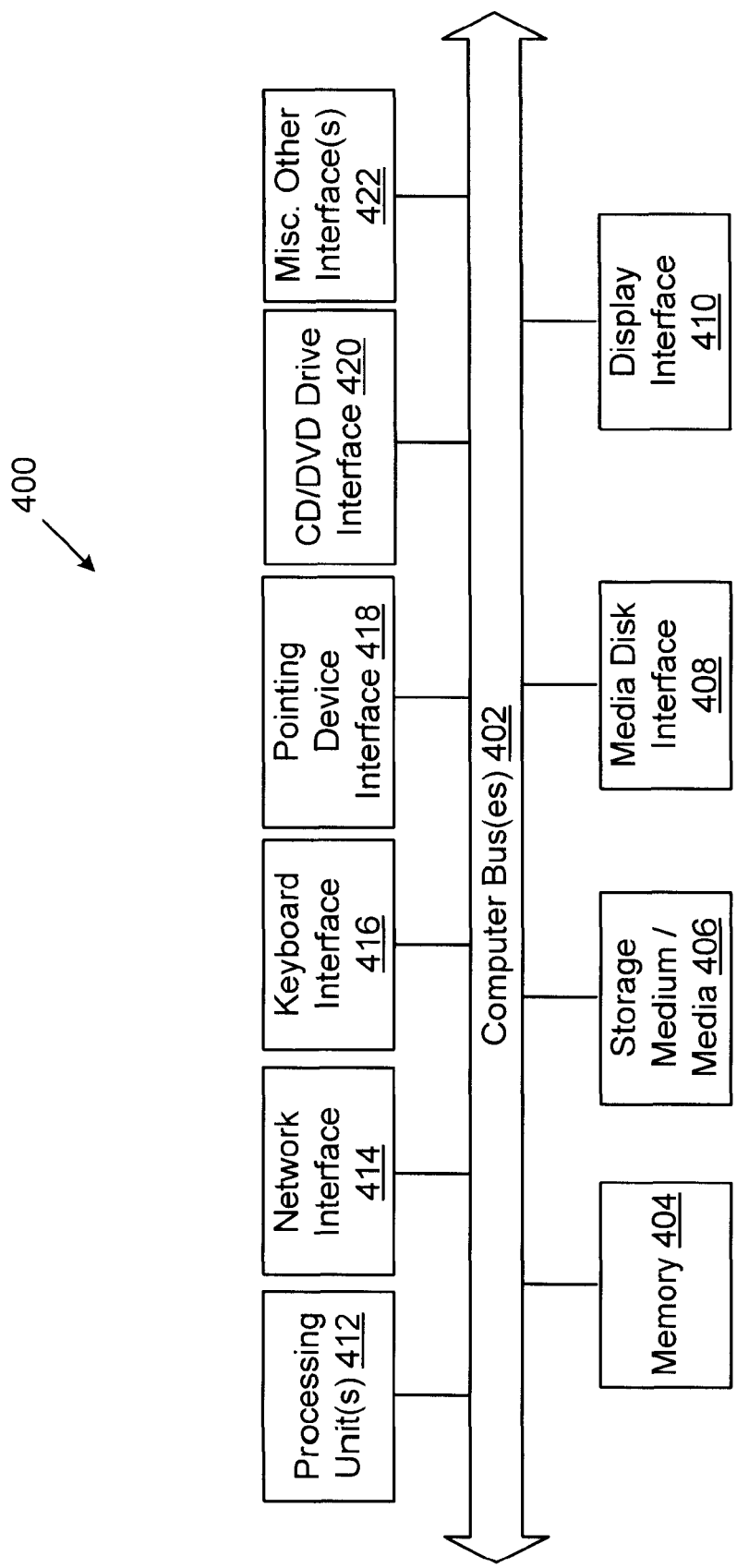
FIG. 4 is a block diagram illustrating an internal architecture of a computing device in accordance with an embodiment of the present disclosure.

FIG. 4 is a block diagram illustrating an internal architecture of an example of a computing device, such as server computer 110 and/or user computer 105, in accordance with one or more embodiments of the present disclosure. A computer or computing device as referred to herein refers to any device with a processor capable of executing logic or coded instructions, and could be a server, personal computer, set top box, smart phone, pad computer or media device, to name a few such devices. As shown in the example of FIG. 4, internal architecture 400 includes one or more processing units (also referred to herein as CPUs) 412, which interface with at least one computer bus 402. Also interfacing with computer bus 402 are persistent storage medium/media 406, network interface 414, memory 404, e.g., random access memory (RAM), run-time transient memory, read only memory (ROM), etc., media disk drive interface 408 as an interface for a drive that can read and/or write to media including removable media such as floppy, CD-ROM, DVD, etc. media, display interface 410 as interface for a monitor or other display device, keyboard interface 416 as interface for a keyboard, pointing device interface 418 as an interface for a mouse or other pointing device, and miscellaneous other interfaces not shown individually, such as parallel and serial port interfaces, a universal serial bus (USB) interface, and the like.

Memory 404 interfaces with computer bus 402 so as to provide information stored in memory 404 to CPU 412 during execution of software programs such as an operating system, application programs, device drivers, and software modules that comprise program code, and/or computer-executable process steps, incorporating functionality described herein, e.g., one or more of process flows described herein. CPU 412 first loads computer-executable process steps from storage, e.g., memory 404, storage medium/media 406, removable media drive, and/or other storage device. CPU 412 can then execute the stored process steps in order to execute the loaded computer-executable process steps. Stored data, e.g., data stored by a storage device, can be accessed by CPU 412 during the execution of computer-executable process steps.

Persistent storage medium/media 406 is a computer readable storage medium(s) that can be used to store software and data, e.g., an operating system and one or more application programs. Persistent storage medium/media 406 can also be used to store device drivers, such as one or more of a digital camera driver, monitor driver, printer driver, scanner driver, or other device drivers, web pages, content files, playlists and other files. Persistent storage medium/media 406 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving over a network, by a server computer from a user computer operated by a user managing a fantasy sports team in a head-to-head fantasy sports league, the fantasy sports team comprising a team whose score is adjusted based on activities of real-life sports athletes in one or more real-life sporting events:
an active roster of players of the fantasy sports team, bench players of the fantasy sports team, and an inactive roster of players of the fantasy sports team, wherein the active roster comprises players eligible to play and gather statistics for a predetermined period of time and wherein the active roster is larger than a starting lineup associated with the fantasy sports team, and wherein the inactive roster comprises players of the fantasy sports team that are assigned by the user to not accumulate points during the predetermined period of time and who cannot become bench players or part of the active roster during the predetermined period of time, wherein the players of the inactive roster comprise any players designated by the user as inactive due to one or more of lack of skill, injury, and player personal reasons;
determining, by the server computer, points earned by each player of the active roster of the fantasy sports team; and
transmitting, by the server computer to the user computer, the active roster, the bench players, the inactive roster, and the points earned by the each player of the active roster of the fantasy sports team.

2. The method of claim 1, wherein a bench player can be moved into the active roster to accumulate points during the predetermined period of time.

3. The method of claim 1, wherein inactive roster slots of the inactive roster are displayed as having shading different than shading of the bench players and different than shading of each player of the active roster.

4. The method of claim 1, wherein the determining of points earned by each player of the active roster further comprises determining statistics associated with the players of the active roster.

5. The method of claim 4, wherein the determined statistics comprise a statistic type from a group of statistics types consisting of an opponent that the each player is playing against, a time of a game against the opponent, and a percent that the each player has started.

6. The method of claim 1, wherein the inactive roster and the active roster limits the impact of streaming.

7. The method of claim 1, further comprising receiving, from the user computer, a player as part of the active roster after the player was part of the inactive roster after the predetermined period of time.

8. The method of claim 1, wherein the transmitting of the active roster, the bench players, the inactive roster, and the points earned by the each player of the active roster further comprises transmitting a news story associated with one or more players of the fantasy sports team.

9. The method of claim 1, wherein the transmitting of the active roster, the bench players, the inactive roster, and the points earned further comprises updating the active roster and the inactive roster.

10. A non-transitory computer-readable storage medium tangibly storing thereon computer program instructions capable of being executed by a computer processor of a computing device, the computer program instructions defining the steps of:
receiving over a network, by a server computer from a user computer operated by a user managing a fantasy sports team in a head-to-head fantasy sports league, the fantasy sports team comprising a team whose score is adjusted based on activities of real-life sports athletes in one or more real-life sporting events:
an active roster of players of the fantasy sports team, bench players of the fantasy sports team, and an inactive roster of players of the fantasy sports team, wherein the active roster comprises players eligible to play and gather statistics for a predetermined period of time and wherein the active roster is larger than a starting lineup associated with the fantasy sports team, and wherein the inactive roster comprises players of the fantasy sports team that are assigned by the user to not accumulate points during the predetermined period of time and who cannot become bench players or part of the active roster during the predetermined period of time, wherein the players of the inactive roster comprise any players designated by the user as inactive due to one or more of lack of skill, injury, and player personal reasons;
determining, by the server computer, points earned by each player of the active roster of the fantasy sports team; and
transmitting, by the server computer to the user computer, the active roster, the bench players, the inactive roster, and the points earned by the each player of the active roster of the fantasy sports team.

11. The non-transitory computer-readable storage medium of claim 10, wherein a bench player can be moved into the active roster to accumulate points during the predetermined period of time.

12. The non-transitory computer-readable storage medium of claim 10, wherein inactive roster slots of the inactive roster are displayed as having shading different than shading of the bench players and different than shading of each player of the active roster.

13. The non-transitory computer-readable storage medium of claim 10, wherein the determining of points earned by each player of the active roster further comprises determining statistics associated with the players of the active roster.

14. The non-transitory computer-readable storage medium of claim 13, wherein the determined statistics comprise a statistic type from a group of statistics types consisting of an opponent that the each player is playing against, a time of a game against the opponent, and a percent that the each player has started.

15. The non-transitory computer-readable storage medium of claim 10, wherein the inactive roster and the active roster limits the impact of streaming.

16. The non-transitory computer-readable storage medium of claim 10, further comprising receiving, from the user computer, a player as part of the active roster after the player was part of the inactive roster after the predetermined period of time.

17. The non-transitory computer-readable storage medium of claim 10, wherein the transmitting of the active roster, the bench players, the inactive roster, and the points earned by the each player of the active roster further comprises transmitting a news story associated with one or more players of the fantasy sports team.

18. The non-transitory computer-readable storage medium of claim 10, wherein the transmitting of the active roster, the bench players, the inactive roster, and the points earned further comprises updating the active roster and the inactive roster.

19. A computing device comprising:
  a processor;
  a storage medium for tangibly storing thereon program logic for execution by the processor, the program logic comprising:
    logic executed by the processor for receiving over a network, from a user computer operated by a user managing a fantasy sports team in a head-to-head fantasy sports league, the fantasy sports team comprising a team whose score is adjusted based on activities of real-life sports athletes in one or more real-life sporting events:
    an active roster of players of the fantasy sports team, bench players of the fantasy sports team, and an inactive roster of players of the fantasy sports team, wherein the active roster comprises players eligible to play and gather statistics for a predetermined period of time and wherein the active roster is larger than a starting lineup associated with the fantasy sports team, and wherein the inactive roster comprises players of the fantasy sports team that are assigned by the user to not accumulate points during the predetermined period of time and who cannot become bench players or part of the active roster during the predetermined period of time, wherein the players of the inactive roster comprise any players designated by the user as inactive due to one or more of lack of skill, injury, and player personal reasons;
  logic executed by the processor for determining points earned by each player of the active roster of the fantasy sports team; and
  logic executed by the processor for transmitting, to the user computer, the active roster, the bench players, the inactive roster, and the points earned by the each player of the active roster of the fantasy sports team.

20. The computing device of claim 19, wherein a bench player can be moved into the active roster to accumulate points during the predetermined period of time.

* * * * *